(12) United States Patent
Fuhr

(10) Patent No.: US 12,109,794 B2
(45) Date of Patent: Oct. 8, 2024

(54) STAINABLE MELAMINE LAMINATE PRODUCTS, COMPOSITIONS, AND METHODS OF MANUFACTURE

(71) Applicant: PRESSING DEVELOPMENTS, L.L.C., Georgetown, TX (US)

(72) Inventor: Adam Curtis Fuhr, Georgetown, TX (US)

(73) Assignee: Pressing Developments, L.L.C., Georgetown, TX (US)

( * ) Notice: Subject to any disclaimer, the term of this patent is extended or adjusted under 35 U.S.C. 154(b) by 0 days.

(21) Appl. No.: 15/674,510

(22) Filed: Aug. 10, 2017

(65) Prior Publication Data
US 2018/0043655 A1 Feb. 15, 2018

Related U.S. Application Data (60) Provisional application No. 62/412,256, filed on Oct. 24, 2016, provisional application No. 62/373,287, filed on Aug. 10, 2016.

(51) Int. Cl.
*B32B 5/18* (2006.01)
*B32B 27/08* (2006.01)
(Continued)

(52) U.S. Cl.
CPC ............... *B32B 5/18* (2013.01); *B32B 27/08* (2013.01); *B32B 27/10* (2013.01); *B32B 27/42* (2013.01);
(Continued)

(58) Field of Classification Search
None
See application file for complete search history.

(56) References Cited

U.S. PATENT DOCUMENTS

| | | |
|---|---|---|
| 3,434,919 A | 3/1969 | Whitman |
| 4,140,837 A | 2/1979 | Drees et al. |

(Continued)

FOREIGN PATENT DOCUMENTS

| | | |
|---|---|---|
| EP | 0 054 405 A1 | 6/1982 |
| JP | 2003225985 A | 8/2003 |

(Continued)

OTHER PUBLICATIONS

International Search Report for PCT/US2017/046386 dated Oct. 27, 2017.
(Continued)

*Primary Examiner* — Hai Vo
(74) *Attorney, Agent, or Firm* — Scott H. Blackman; Rodney J. Fuller; BOOTH UDALL FULLER, PLC (57) ABSTRACT

The present disclosure describes melamine laminate products capable of retaining a wood stain or colorant. The unique melamine formulations and products include porosity-promoting agents that result in the melamine having a porous surface capable of being stained with a wood stain or other colorant, while still having the favorable properties of traditional laminate products. The methods of the invention produce a melamine laminate product that can be stained with a variety of stains and colorants after manufacturing to suit the individual builder's or homeowner's preference. The stainable melamine laminate products may include a decorative paper layer sandwiched between a backing layer and a melamine layer embedded with a porosity agent, such as, silica, wax, mica, calcium carbonate, silane, kaolin clay, crystalline silica, corn starch, feldspar, talc, or combinations thereof. The stainable melamine layer optionally has a textured top surface.

16 Claims, 7 Drawing Sheets

(51) Int. Cl.
*B32B 27/10* (2006.01)
*B32B 27/42* (2006.01)
*C09D 161/28* (2006.01)

(52) U.S. Cl.
CPC .... *C09D 161/28* (2013.01); *B32B 2266/0285* (2013.01); *B32B 2451/00* (2013.01)

(56) References Cited

U.S. PATENT DOCUMENTS

| | | | |
|---|---|---|---|
| 4,258,103 | A | 3/1981 | Hosmer et al. |
| 5,229,217 | A | 7/1993 | Holzer |
| 5,702,806 | A | 12/1997 | O'Dell et al. |
| 6,001,925 | A | 12/1999 | Gapud et al. |
| 2002/0160680 | A1* | 10/2002 | Laurence ............... B32B 27/36 442/394 |
| 2003/0055145 | A1* | 3/2003 | Safta ...................... D21H 27/28 524/430 |
| 2008/0268273 | A1 | 10/2008 | O'Brien et al. |
| 2010/0307675 | A1* | 12/2010 | Buhlmann ............ D21H 27/28 156/272.2 |
| 2010/0310893 | A1* | 12/2010 | Derbyshire ............. B32B 21/02 524/13 |
| 2012/0128946 | A1* | 5/2012 | Kwon ...................... B32B 5/02 428/195.1 |
| 2017/0328063 | A1* | 11/2017 | Andre .................... E04C 2/246 |

FOREIGN PATENT DOCUMENTS

| | | |
|---|---|---|
| JP | 3998531 B2 | 10/2007 |
| KR | 100579841 B1 | 5/2006 |
| WO | 2004076177 A1 | 9/2004 |
| WO | 2009/141743 A1 | 11/2009 |
| WO | 2016079245 A1 | 5/2016 |

OTHER PUBLICATIONS

Written Opinion of the International Searching Authority for PCT/US2017/046386 dated Oct. 27, 2017.

* cited by examiner

STAINABLE MELAMINE LAMINATE PRODUCTS, COMPOSITIONS, AND METHODS OF MANUFACTURE

RELATED APPLICATIONS

This application claims the benefit of U.S. Provisional Application No. 62/373,287, filed on Aug. 10, 2016 and the benefit of U.S. Provisional Application No. 62/412,256, filed on Oct. 24, 2016, the contents of each of which are incorporated herein by reference thereto in their entireties.

TECHNICAL FIELD

This disclosure relates to stainable melamine laminate products, melamine formulations, and methods of manufacturing stainable melamine laminate products. The methods disclosed herein provide a melamine laminate product capable of being stained, including with typical wood stains, other stains or colorants.

BACKGROUND

Laminated engineered wood products are in high demand in the market and used in applications including furniture, cabinetry, flooring, walls, paneling, doors, and shelving. Many engineered wood products are laminated with a thermoset polymer adhered to a composite wood substrate. These laminated engineered wood products can be more economical and long-lasting than traditional wood products, but laminated engineered wood products are not reliably stainable. Consumer demand for high quality products that look like wood has led to laminated porous panel products and other engineered wood products that mimic wood grains and colors, but it is typically evident even without close inspection that the product is not real wood.

Laminated engineered wood products that appear "wood-like" also suffer from an additional drawback—they rely on processes that fix the color of the laminate at the factory. Thus, a consumer or decorator is limited in color choice and forced to buy laminated engineered wood products from a single manufacturer if the products are to match each other in color. Further, a manufacturer must determine how many shades and patterns of different wood-like products to carry and manufacture. This inflexibility at the manufacturer leads to both unsold stock and unmet consumer demand when the colors produced do not accurately predict demand. Even still, the consumer often makes compromises by limiting color choices or unknowingly installing poor color matches.

In contrast, hardwood veneers are able to readily take a wood stain that can be applied on-site. Hardwood veneers, however, are costly and many desirable and exotic hardwood veneers use hardwood materials that may not be sustainable wood products. The cost of engineered wood products is drastically lower than hardwood veneers. These engineered wood products are also much more sustainable as they are byproducts of the woodworking industry globally.

Accordingly, there is a need for Laminate engineered wood products and methods of manufacturing engineered wood products that are capable of being stained with a wood stain, other stain or colorant. There is also a need to provide compositions and methods of providing a professional high quality look similar to hardwood veneer panels or better. The products and methods disclosed herein would reduce manufacturing and consumer costs and provide far greater flexibility for the consumer to use a number of various wood stains and staining methods currently available for wood and hardwood veneers only.

SUMMARY

Aspects of this document relate to stainable melamine laminate products, melamine formulation compositions, and methods of manufacturing stainable melamine laminate products. These aspects may comprise, and implementations may include, one or more or all of the components and steps set forth in the appended claims, which are hereby incorporated by reference. In one aspect, a stainable melamine laminate product comprises: a substrate; and a melamine layer affixed to the substrate, wherein the melamine layer comprises a melamine formulation and a sheet, the melamine formulation having a porosity agent to allow staining of the melamine.

Particular embodiments and implementations may comprise one or more of the following features. The porosity agent or a combination of porosity agents is in an amount of between 25 to 175 grams per square meter. The first side of the sheet is saturated with the melamine formulation comprising the porosity agent and the sheet is a decorative paper. The porosity agent or a combination of porosity agents comprise between 10% and 70%, more preferably between 25% and 65% of the weight of the melamine formulation before curing, or between 30% and 80% of the weight of the melamine formulation after curing. The porosity agent or a combination of porosity agents comprise between 35% and 75% of the weight of the melamine formulation before curing, or between 40% and 85% of the weight of the melamine formulation after curing. The porosity agent or a combination of porosity agents comprise between 40% and 70% of the weight of the melamine formulation before curing, or between 45% and 75% of the weight of the melamine formulation after curing. The porosity agent or a combination of porosity agents comprise between 35% and 75% (e.g., 40-75%, 45-70%, 50-65%, 45-65%, 45-55%, 50-60%, 50-55%, 55-65%, 50-70%, 55-75%, or 60-75%) of the weight of the melamine formulation before curing, or between 40% and 85% (e.g., 45-85%, 45-80%, 45-80%, 45-75%, 50-75%, 55-75%, 50-70%, 60-70%, 60-80%, 55-80%, 55-70%, or 55-65%) of the weight of the melamine formulation after curing. The porosity agent or a combination of porosity agents comprise at least 35% (e.g., at least 35%, at least 40%, at least 45%, at least 50%, at least 55%, at least 60%, or at least 65%) of the weight of the melamine formulation before curing, or at least 40% (e.g., at least 40%, at least 45%, at least 50%, at least 55%, at least 60%, at least 65%, or at least 70%) of the weight of the melamine formulation after curing.

Particular embodiments and implementations may comprise one or more of the following features. The stainable melamine laminate product further comprises: a phenolic backing layer having a first side and a second side opposite the first side, the first side being affixed to the melamine laminate product; and a decorative design on the phenolic backing layer; wherein the sheet is non-opaque and affixed to the second side of the backing layer. The stainable melamine laminate product further comprises a second melamine layer, the second melamine layer comprising a second sheet and a melamine formulation having a porosity agent, wherein the second melamine layer is affixed to the first melamine layer.

In one aspect, a stainable melamine laminate product comprises: a phenolic backing layer having a first side and a second side opposite the first side, the first side being affixed to the melamine laminate product; and a melamine layer affixed to the second side of the backing layer, wherein the melamine layer comprises a melamine formulation and a non-opaque melamine saturated sheet, the melamine formulation having a porosity agent.

Particular embodiments and implementations may comprise one or more of the following features. The porosity agent is selected from the group consisting of: kaolin clay; crystalline silica; corn starch; talc; feldspar; titanium dioxide; mica; calcium carbonate; untreated silica particles; cellulosic particles; wax particles; MINEX® (Nepheline Syenite); silicon dioxide; sodium oxide; calcium oxide; iron oxide; potassium oxide; precipitated calcium carbonate; wollastonite; silicate minerals; or combination thereof. The phenolic backing layer comprises paper. The melamine layer further comprises: at least a second porosity agent. The decorative design comprises a design of a wood grain.

In one aspect, a method of manufacturing a stainable melamine laminate product comprises: saturating a sheet with a melamine formulation, the melamine formulation comprising between 35% and 80% by weight of a porosity agent or a combination of porosity agents; partially curing the sheet with heat; and pressing the sheet to a substrate under heat and pressure. In another aspect, a method of manufacturing a stainable melamine laminate product comprises: saturating a sheet with a melamine formulation, the melamine formulation comprising between 35% and 80% by weight of a porosity agent or a combination of porosity agents; partially curing the sheet with heat; and pressing the sheet to a substrate under heat and pressure.

Particular embodiments and implementations may comprise one or more of the following features. The method of manufacturing a stainable melamine laminate product further comprises: applying a stain to the sheet; and applying a finishing coat to the sheet over the stain. The porosity agent or the combination of porosity agents comprises between 35% and 65% of the total formulation weight of the melamine formulation. The porosity agent or the combination of porosity agents comprises between 40% and 65% of the total formulation weight of the melamine formulation. The porosity agent or the combination of porosity agents comprises between 45% and 55% of the total formulation weight of the melamine formulation. The porosity agent or a combination of porosity agents is in an amount of between 40 to 150 grams per square meter. The porosity agent or a combination of porosity agents is in an amount of between 40 to 140 grams per square meter. The porosity agent or a combination of porosity agents is in an amount of between 50 to 130 grams per square meter. The porosity agent or a combination of porosity agents is in an amount of between 60 to 120 grams per square meter. The porosity agent or a combination of porosity agents is in an amount of between 55 to 125 grams per square meter. The porosity agent or a combination of porosity agents is in an amount of between 70 to 140 grams per square meter. The porosity agent or a combination of porosity agents is in an amount of between 40 to 145 grams per square meter (e.g., 45-140, 50-135, 60-135, 60-110, 55-100, 55-145, 55-125, 65-140, 65-125, 65-110, 65-90, 75-145, 75-125, or 80-110 grams per square meter).

Particular embodiments and implementations may comprise one or more of the following features. At least one porosity agent is a mineral ranging in size from 1-75 μm and/or a density from 1.0 to 3.5 g/cm$^3$. The at least one porosity agent is a mineral with a density from 0.9 to 3.8 g/cm$^3$, the mineral ranging in size from 1-85 μm. At least one porosity agent is selected from the group consisting of: kaolin clay; crystalline silica; corn starch; talc; feldspar; titanium dioxide; mica; calcium carbonate; untreated silica particles; cellulosic particles; wax particles; MINEX® (Nepheline Syenite); silicon dioxide; sodium oxide; calcium oxide; iron oxide; potassium oxide; precipitated calcium carbonate; wollastonite; silicate minerals; or combination thereof. At least one porosity agent is selected from the group consisting of: talc, feldspar, MINEX" (Nepheline Syenite), calcium carbonate, untreated silica, treated silica, kaolin clay; or combination thereof.

In one aspect, a melamine formulation composition comprises: a melamine formaldehyde resin; and a porosity agent, wherein the porosity agent or combination of porosity agents is from 35% to 80% of total formulation weight.

Particular embodiments and implementations may comprise one or more of the following features. At least one additive, wherein the additive is from 0% to 5% of total formulation weight. At least one additive, wherein the additive is from 0% to 5% (e.g., 0-4%, 0-3%, 0-2%, 0.2-4%, 0.2-2.5%, 0.5-3.5%, 1-4%, 1-2%, 2-5%, 3-4%, or 3-5%) of total formulation weight. At least one additive, wherein the additive is up to 10% (e.g., up to 9%, 7.5%, 6%, 4%, 2%, 8%, or 7%) of total formulation weight. The porosity agent or combination of porosity agents comprises between 35% and 65% of the total formulation weight of the melamine formulation. The porosity agent or combination of porosity agents comprises between 40% and 65% of the total formulation weight of the melamine formulation. The porosity agent or combination of porosity agents comprises between 45% and 55% of the total formulation weight of the melamine formulation.

Particular embodiments and implementations may comprise one or more of the following features. At least one porosity agent is selected from the group consisting of: kaolin clay; crystalline silica; corn starch; talc; feldspar; titanium dioxide; mica; calcium carbonate; untreated silica particles; cellulosic particles; wax particles; MINEX® (Nepheline Syenite); silicon dioxide; sodium oxide; calcium oxide; iron oxide; potassium oxide; precipitated calcium carbonate; wollastonite; silicate minerals; or combination thereof. At least one porosity agent is selected from the group consisting of: talc, feldspar, MINEX® (Nepheline Syenite), calcium carbonate, untreated silica, treated silica, kaolin clay, or combination thereof.

BRIEF DESCRIPTION OF THE DRAWINGS

FIGS. 1-13 are not drawn to scale and should not be interpreted as being to scale. For example, the substrate or porous panel product shown may be tens or hundreds of times thicker than the total of all melamine and backing layers.

DETAILED DESCRIPTION

The verb "comprise" as is used in this description and in the claims and its conjugations are used in its non-limiting sense to mean that items following the word are included, but items not specifically mentioned are not excluded. In addition, reference to an element by the indefinite article "a" or "an" does not exclude the possibility that more than one of the elements are present, unless the context clearly requires that there is one and only one of the elements. The indefinite article "a" or "an" thus usually means "at least one."

As used herein, the term "porous panel product" refers to engineered wood products that are composite materials manufactured by binding or fixing the strands, particles, fibers, chips, or boards of woods together with some method of fixation. Specific examples of porous panel products include medium density fiberboard (MDF), a high density fiberboard (HDF), a medium density overlay (MDO), or a high density overlay (HDO), oriented strand board (OSB), particle board, chip board, vermiculite, fiber-reinforced plastic (FRP), panel products, and plywood. One of ordinary skill in the art will recognize that the materials used to construct a porous panel product may change over time as availability of resources change, and porous panel products may be constructed at least partially of other plant materials (e.g., palm trees or plants, plant or tree leaves, palm fronds, coconuts, coconut husks, natural rubber, grasses, bamboo, fibrous plant material, etc.) and non-plant materials (e.g., plastics, synthetic rubber, recycled materials, etc.), and the term "porous panel product" may include one or more of these materials or other materials yet to be developed or yet to come into use. In preferred embodiments, a porous panel product refers to a particle board, chip board, oriented strand board (OSB), medium density fiberboard (MDF), a high density fiberboard (HDF), a medium density overlay (MDO), or a high density overlay (HDO).

As used herein, the term "resin" refers generally to synthetic materials that are viscous liquids capable of hardening permanently. Examples of resins include polymers, melamines, thermosetting plastics, phenolics, oligomers, alkyds, acrylics, acrylates, epoxies, urethanes, urea formaldehydes, polyesters, and polycarbonates.

As used herein, the term "additive" refers to generally to compounds that make the product flow, level, dilute, reduce, react, and/or defoam, for example a deaerator. Accordingly, additives include surface modifiers, curing agents, and the like.

As used herein, the terms "wood stain" or "stain" refer to a colorant (e.g., one or more dyes and/or pigments) suspended or dissolved in an agent or solvent, including without limitation: oil stains, varnish stains, water-based stains, solvent-based stains, gel stains, lacquer stains, water-soluble dye stain, ultra-violet (UV) light cured colorants (resins, sealants, stains, etc.), metal-complex (metalized) dye stains, or similar stains or colorants now existing or yet to be discovered that may be used to stain wood, porous panel products, or other porous organic and inorganic materials.

As used herein, the terms "finishing coating" or "finishing coat" refer to coating layer(s) visible upon completion and final assembly of a product made from porous panel product, such as cabinetry, flooring, furniture, millwork, and fixtures. Generally, the finishing coating is applied to the surface of a sealed/primed substrate, and lacquers and varnishes are common examples of finishing coatings.

The present disclosure relates to the discovery that certain porosity-promoting surface agents included in a formulation of a melamine resin (and/or other thermosetting resins) impregnated in a paper layer result in the resin saturated layer having a porous surface that is capable of being stained with a wood stain or other colorant, which allows a laminate product or other melamine-coated product to be stained with a variety of wood stains after being manufactured.

Figure 1:
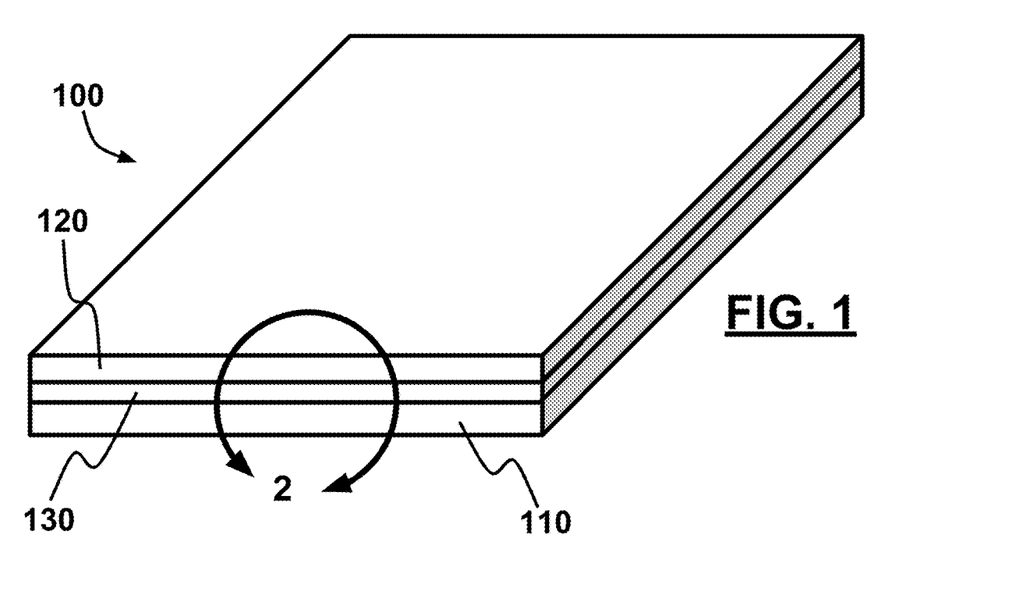
FIG. 1 depicts an example of a stainable melamine product.
Figure 2:
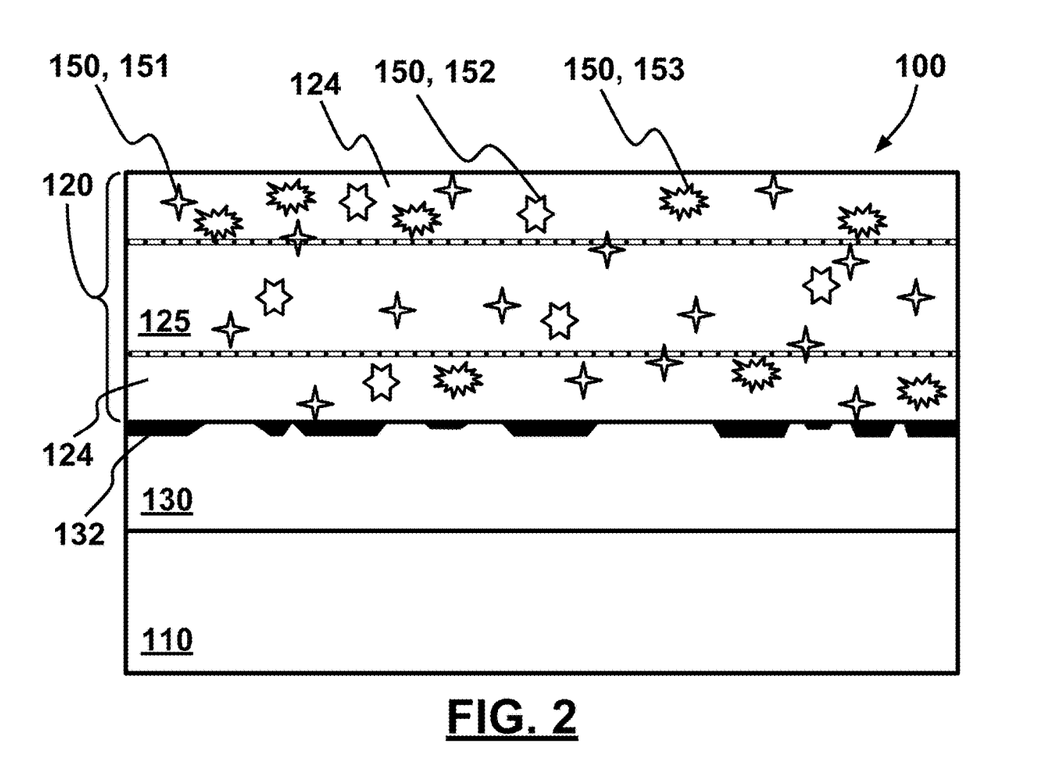
FIG. 2 depicts a non-limiting example of a stainable melamine product.

FIGS. 1-2 depict various implementations of a stainable laminate product 100 formed by adding at least one porosity agent 150 before pressing and curing the melamine resin 124. A stainable laminate product 100 is formed by adding at least one porosity agent 150 to a melamine layer 120 before pressing and curing the melamine layer 120. Existing formulations of melamine-formaldehyde resins may be used in the present disclosure to create stainable melamine layers 120 by adding porosity agents 150 as disclosed herein. For example, melamine-formaldehyde resin may be commercially available from manufacturers, such as: Dynea International Oy; Georgia-Pacific Chemicals, LLC; or Hexion Specialty Chemicals, Inc. Additionally, the melamine resin 124 may also contain one or more plasticizers, surfactants, defoaming agents, thickening agents, leveling agents, latent catalysts, or wetting agents. In processing, the melamine resin may be diluted (e.g., with a solvent or water) in a bath for saturating the paper or other layer (e.g., sheet 125) being processed in the melamine bath.

The stainable melamine layer 120 includes porosity agents 150 and melamine resin 124 impregnated in any one of a variety of different sheets of paper or fiber sheets (see sheet 125 in FIG. 2) including, for example: decorative paper, kraft paper, overlay paper, cellulose paper, foil, nylon, rayon, wood pulp, wood veneer, linen, fabric, or other papers or fibers for use in laminates or with melamine resin 124. The sheet 125 allows the melamine resin 124 to soak through the sheet 125 and also provide a structure for the melamine resin 124 to cling to the top and bottom surfaces of the sheet 125. In numerous embodiments, the sheet 125 in the top-most melamine layer 120 is a translucent paper or fiber (e.g., overlay paper or cellulose paper), which allows the resulting translucent top-most melamine layer 120 to cover and protect a decorative paper layer 130 containing any one of various different colors or patterns on decorative papers (e.g., a printed decoration or pattern 132). In alternative embodiments, the sheet 125 in the top-most melamine layer 120 is a decorative paper with no overlay paper, cellulose paper, or translucent papers or fibers placed over the decorative paper. A conventional melamine layer (i.e., not a stainable melamine layer 120) used as the top-most layer typically utilizes overlay paper in heavy duty use cases (because this provides additional scratch and wear protection above a decorative paper), and may utilize only the decorative paper (with no overlay paper) in light duty use cases.

The stainable laminate product 100 includes a stainable melamine layer 120, and the stainable melamine layer 120 is formed by saturating a sheet 125 with a melamine resin 124 that contains at least one porosity agent 150. Porosity agents 150 that have been found to perform well are generally inert minerals that do not become fully saturated with the melamine resin 124 or otherwise provide routes and pathways for a wood stain to seep through the porosity agents 150 down to ultimately stain the sheet 125. In numerous cases, the porosity agents 150 also do not substantially alter the curing times of the sheet 15 saturated with melamine resin 124. A non-limiting list of porosity agents 150 includes: kaolin clay; crystalline silica; corn starch; talc; feldspar; titanium dioxide; mica; calcium carbonate; untreated silica particles; cellulosic particles; wax particles; MINEX® (Nepheline Syenite) from Unimin Corp. of New Canaan, CT; silicon dioxide; sodium oxide; aluminum oxide (if contained within a filler mixture such as MINEX® fillers including Nepheline Syenite); calcium oxide; iron oxides;

potassium oxide; precipitated calcium carbonate; wollastonite; silicate minerals; combinations thereof; or other minerals that would commonly be used in the production of paint and coatings; or other agents that result in a cured melamine surface having porous characteristics that enable a stain to penetrate into the melamine layer 120. In some embodiments, the porosity agent 150 is a porous mineral. The porosity agents 150 may also be synthetic non-minerals or polymers that do not become fully saturated with the melamine resin 124 or otherwise provide passage for the wood stain to reach the sheet 125 embedded in the melamine layer 120. In some embodiments, a porosity agent 150 is: talc, feldspar, MINEX® (Nepheline Syenite), calcium carbonate, silica (treated and untreated), or kaolin clay. In certain embodiments, a porosity agent 150 is: feldspar or MINEX® (Nepheline Syenite).

FIG. 2 illustrates a non-limiting example of a melamine layer 120 including three different types of porosity agents 150, which are identified as a first porosity agent type 151, a second porosity agent type 152, and a third porosity agent type 153. For example, the first porosity agent type 151 may be feldspar, the second porosity agent type 152 might be Kaolin clay, and the third porosity agent type 153 may be crystalline silica. In the non-limiting example of FIG. 2, the material used for the sheet 125 has a sufficiently porous structure that both porosity agent types 151 and 152 saturate and penetrate into sheet 125, but the third porosity agent type 153 is too large or otherwise unable to penetrate into the sheet 125. Thus, the third porosity agent type 153 depicted in FIG. 2 is dispersed throughout the stainable melamine layer 120 above and below the sheet 125, but not within the sheet 125. In some embodiments, the porosity agents 150 are not present within or do not substantially penetrate into the sheet 125.

The porosity agents 150 can contribute to creating a stainable laminate product 100 in a number of different ways. The porosity agents 150 distributed throughout the melamine layer 120 provide a path for a stain to seep into and ultimately reach the sheet 125, where the sheet 125 then soaks in, distributes, and holds the stain. Additionally, the porosity agents 150 themselves can soak in stain and help add more of the stain color throughout the melamine layer 120. Experiments have shown that deep and even stain penetration often occurs when the pigment volume concentration of the porosity agent(s) 150 to the melamine resin 124 reaches or exceeds the critical pigment volume concentration of the melamine resin 124. The critical pigment volume concentration of the melamine resin 124 often depends on the physical and chemical characteristics of the porosity agents 150 and how these characteristics interact with the melamine resin 124. Thus, it is understood that the critical pigment volume concentration of the melamine resin 124 will vary across different porosity agents 150. By way of example, if the sheet 125 in FIG. 2 is substantially translucent (e.g., overlay paper or cellulose paper), then allowing a non-opaque stain to seep into and color the sheet 125 will result in the decorative paper layer 130 showing through the stained melamine layer 120. Stains that absorb well into the melamine layer 120 will result in less amount of stain removing or being scratched off in tests such as a cross hatch adhesion tape test (e.g., following ASTM D 3359) or a nickel scratch test (applying a nickel at a 45° angle with 2 pounds of surface weight).

A stainable laminate product 100 may also include a substrate 110. Melamine presses may be used to press at least one stainable melamine layer 120 (and optionally a decorative paper layer 130) onto a substrate 110, such as: kraft paper, backing layer(s), foil, porous panel product, wood, engineered wood, flooring, fabric, linen, fibrous sheets, cellulose, or other surfaces where melamine laminate layers are used. A substrate 110 may operate to provide structural strength to stainable melamine layer(s) 120 (and the optional decorative paper layer 130) above the substrate 110.

A stainable laminate product 100 containing a stainable melamine layer 120 that includes porosity agents 150 may be formed using a number of different laminate pressing methods and processes including, but not limited to: liquid continuous press, high pressure laminate ("HPL") pressing, low pressure laminate pressing, thermally fused laminate ("TFL") (e.g., thermally fused melamine), direct pressed laminate, continuous press laminate, flexible continuous press laminate, or compact laminate pressing. In some embodiments, the stainable laminate product 100 is created using either an HPL process or a TFL process. Generally speaking, a TFL process uses higher temperatures and lower pressure than an HPL process. In addition, the TFL process typically omits underlying kraft paper and bonds the melamine layer 120 (where sheet 125 is a decorative paper) directly onto the substrate 110.

The melamine resin 124 comprising porosity agents 150 to make the stainable melamine layer 120 may be any one of various different commercially available melamine resins. One example of a formulation for a melamine resin 124 includes: 89% by weight of melamine formaldehyde resin; 7.62% by weight of water; 1.6% by weight of additives (not the porosity agents 150); 0.53% by weight of wetting agents; 0.5% by weight of a catalyst; and 0.75% by weight of a plasticizer. Another example of a formulation for a melamine resin 124 includes: 60% solids aqueous solution of melamine formaldehyde resin; adding water to dilute the melamine formaldehyde resin down to 52% solids aqueous solution; and then adding a small amount of release agent and a catalyst (e.g., 0.4% by total weight of a release agent and 0.3% by total weight of a catalyst).

The melamine resin 124 to which the porosity agents 150 are incorporated or added can be any commercially viable melamine resins, including, for example, any of a variety of known melamine formaldehyde resins that are presently commercially available or in use.

molecular formula: $C_3H_6N_6$ or $C_3N_3(NH_2)_3$; IUPAC Name: 1,3,5-triazine-2,4,6-triamine.

Non-limiting examples of melamine formulations are described in greater detail, and hereby incorporated by reference in their entirety, in the following patents and references: U.S. Pat. Nos. 5,702,806; 4,250,282; 4,109,043; 4,044,185; 4,713,299; 2,260,239, 3,496,131; EP Patent No. 0711792; H. Deim, et al. "*Amino Resins*" in Ullmann's Encyclopedia of Industrial Chemistry, 2012, Wiley-VCH, Weinheim; and. In addition, urea formaldehyde resins (e.g., used to pre-wet a sheet 125) and other supplementary or alternative thermosetting resins include commercially available resins and are also described in several of these patent references.

Although many laminate products currently use a melamine-impregnated top-most layer (e.g., overlay paper(s) or decorative paper), the ability to make the top-most layer of a laminate product stainable by adding porosity agents 150 as disclosed is not limited to only layers impregnated with melamine resin 124. The disclosed porosity agents 150 may also be introduced in another thermosetting resin (whether used with or without a melamine resin 124) to create a layer that is capable of being stained with a wood stain or other stain when the resulting layer is partially or fully cured. For example, thermosetting resins including polyurethane resins, urea formaldehyde resins, polyester resins, or acrylic resins can also be used instead of a melamine resin. Polyester resins work well in TFL processes, but melamine resins are more common in TFL processes because polyester resins are more costly. This disclosure will generally refer to the disclosed process with respect to a primarily or exclusively melamine-impregnated layer, but the same process and disclosure will also work with at least one or more alternative thermosetting resins (unless expressly identified otherwise).

Figure 3:
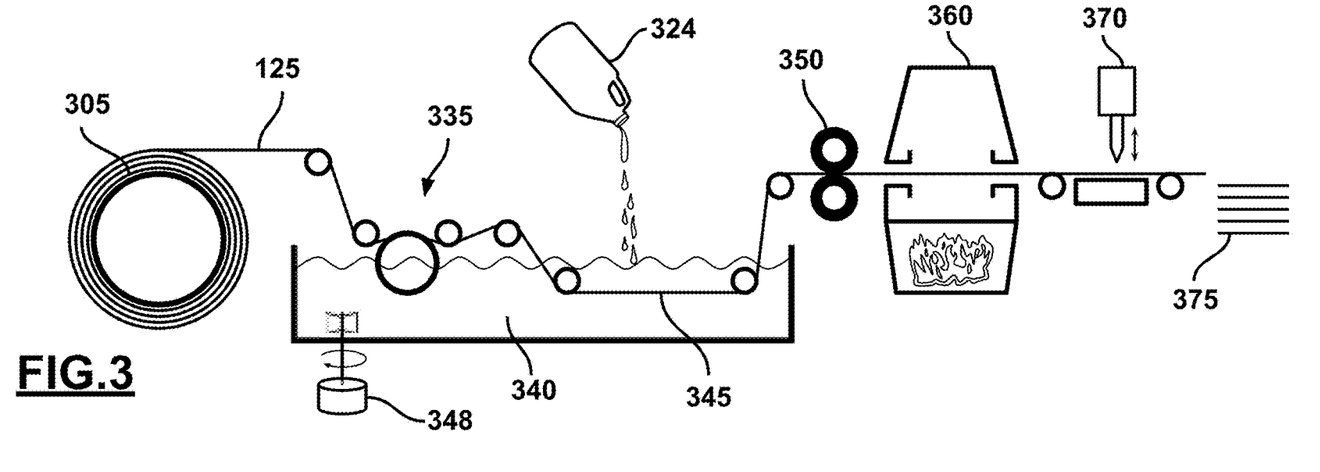
FIGS. 3-5 depict various non-limiting examples of processing a stainable melamine product.
Figure 4:
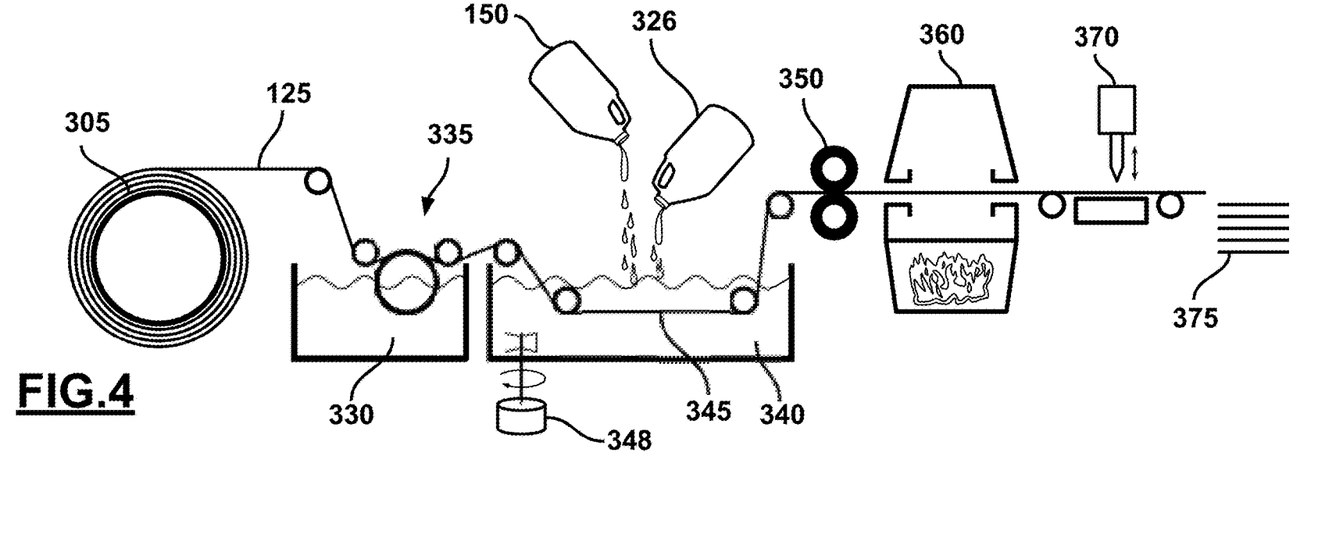
Figure 5:
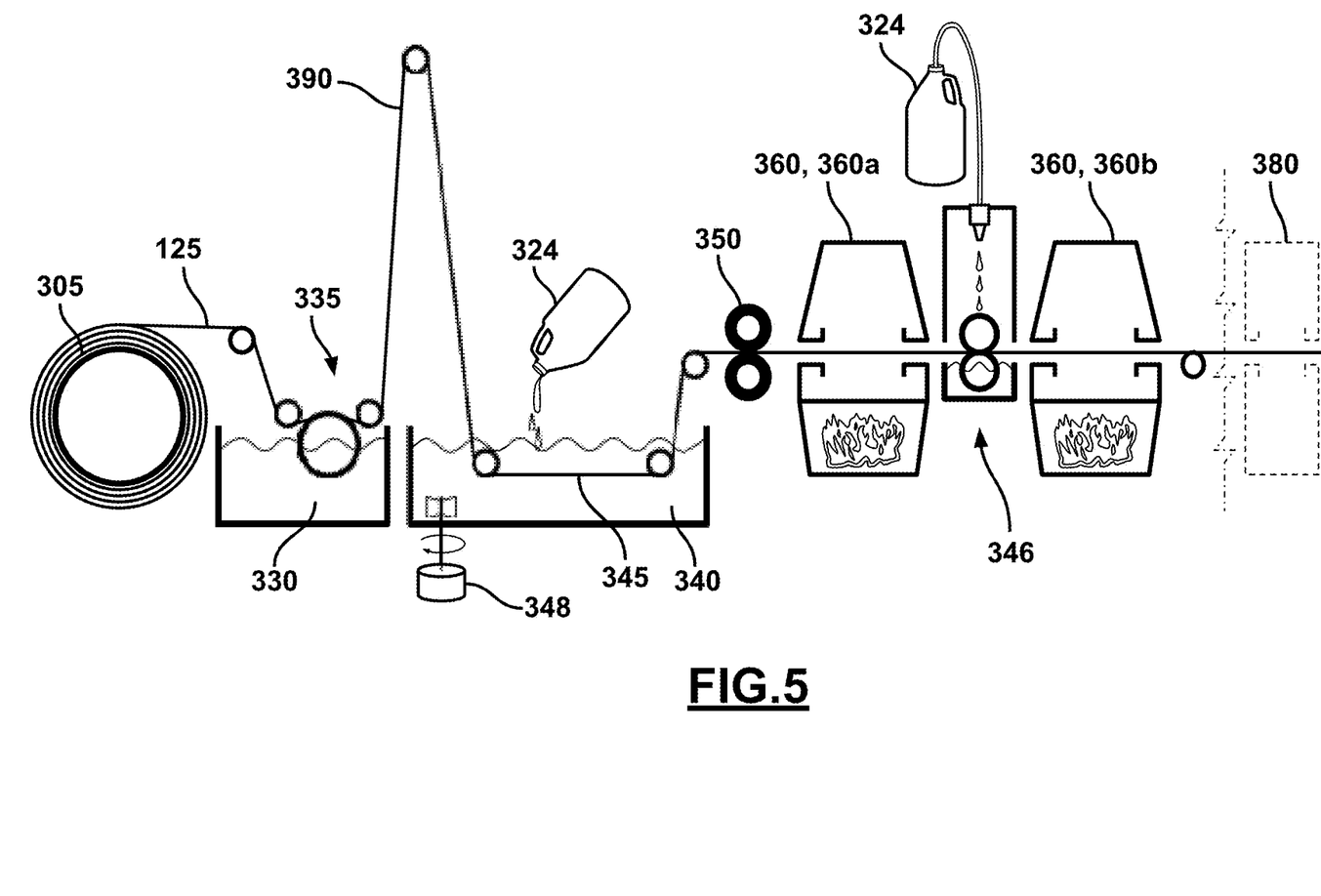

FIGS. 3-5 depict various different processing options for impregnating and saturating porosity agents 150 and melamine resin 124 (and/or thermosetting acrylic resin) into sheet 125. Because either melamine resin 124 or a thermosetting acrylic resin may be used, resin 324 will refer to both resins in the explanation of FIGS. 3-5. Impregnating a sheet 125 with melamine resin 124 or thermosetting acrylic resin includes saturating the sheet 125 (e.g., paper) in a saturation bath 340 of the resin 324. The sheet 125 (e.g., decorative paper, overlay paper, other paper, fabric, etc.) may be stored on a reel 305 that feeds the sheet 125 into the saturation bath 340 and through the curing oven(s) 360. A pre-wetting station 335 may be used to partially or lightly wet the sheet 125 with the resin 324 before completely saturating the sheet 125 in the resin saturation bath 340. The pre-wetting station 335 may be located in a separate pre-wetting bath 330 rather than in the main saturation bath 340 (compare FIG. 3 to FIGS. 4 and 5). In some embodiments, the pre-wetting bath 330 includes urea formaldehyde while the saturation bath 340 includes a melamine resin, a thermosetting resin, or other suitable laminate resin. The pre-wet sheet 125 may be dried (but not cured), for example, using a sky roll 390 or other drying mechanism (see FIG. 5). After leaving the saturation step 345 in the resin saturation bath 340, the sheet 125 proceeds to a curing oven 360. Between the saturation bath 340 and the curing oven 360, a smoothing roll 350 may be used on the sheet 125 to remove excess resin 324 and smooth the sheet 125 before entering the curing oven 360. The sheet 125 in FIGS. 3 and 4 is shown as an example where the sheet 125 partially cures in the curing oven 360 (e.g., a multi-stage, multi-chamber, or variable temperature curing oven) and is then cut at a cutting station 370 and stacked or otherwise stored in curing racks 375 or other storage elements. A curing oven 360 and curing racks 375 will often only partially cure the sheet 125 saturated with resin 325 (e.g., curing to "B stage"), and the sheet 125 does not become fully cured until the sheet 125 undergoes a final heated pressing step where the sheet 125 is typically pressed together with additional sheets, porous panel products, and/or layers (e.g., decorative paper layer 130, kraft paper, overlay paper, backing layer 111, or substrate 110).

FIG. 5 depicts an alternative example where the sheet 125 is impregnated with porosity agents 150 and melamine resin 324 twice: first in the main resin saturation bath 340, and then a second time at a second resin application step 346 positioned after the sheet 125 has partially, but not fully, cured in a first curing oven 360a. The porosity agents 150 included in resin 324 at the first saturation step 345 and the second application step 346 of resin 324 coating in FIG. 5 may use the same porosity agents 150 in both steps 345 and 346 in some implementations, but may also use different porosity agents 150 in each of steps 345 and 346. After the second resin application step 346, the sheet 125 is again partially cured (e.g., cured to "B stage") in a second curing oven 360b and may then optionally undergo additional processing 380.

The resin saturation bath 340 contains at least a resin 324 (e.g., melamine resin or a thermosetting resin) and porosity agents 150. The porosity agents 150 may be added to the resin 324 before being added to the saturation bath 340 (as shown in FIGS. 3 and 5). The porosity agents 150 may alternatively be added directly to the to the saturation bath 340 where a resin 326 that contains no porosity agents 150 is added separately to the saturation bath 340 (as shown in FIG. 4). One or more mixers or agitators 348 may be used to mix and stir the resin 324 and/or the resin saturation bath 340 to keep the porosity agents 150 mixed and suspended rather than settling towards the bottom. An agitator 348 may include paddles or blades as shown in FIGS. 3-5, but may also be a pump, a fluid circulation system, or other circulation, mixing, or agitation system.

Figure 6:
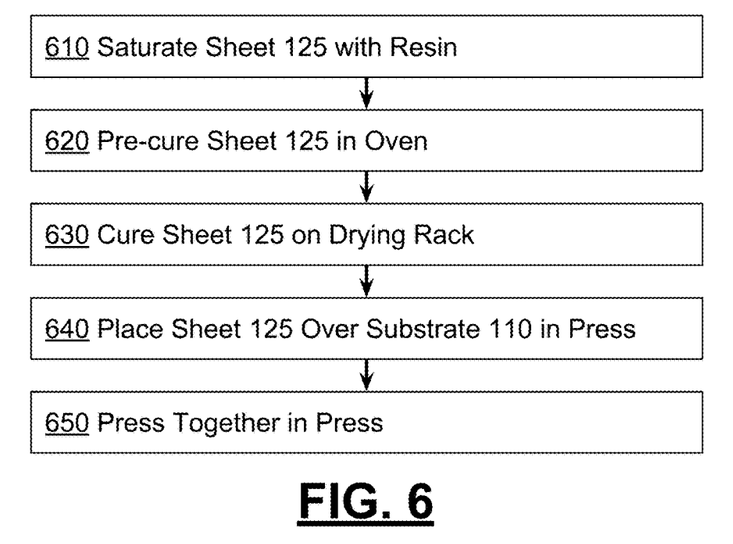
FIGS. 6 & 7 depict various non-limiting examples of a method of creating a stainable melamine product.
Figure 9:
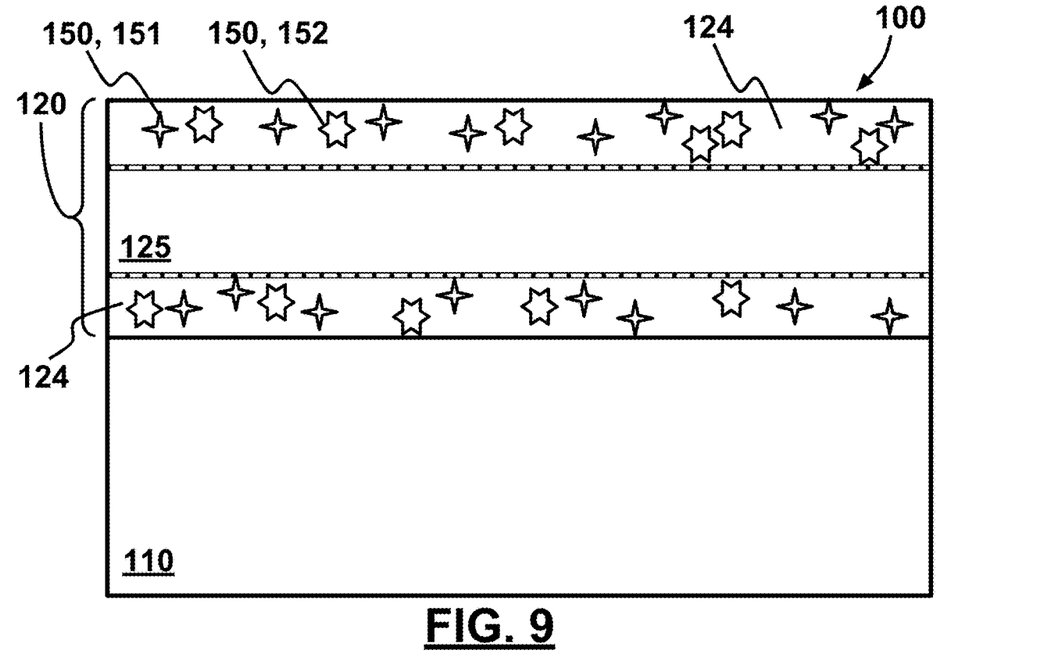

FIG. 6 provides a non-limiting example of a stainable laminate product 100 created using a thermally fused laminate (TFL) process. A sheet 125 is saturated 610 with melamine resin containing at least one porosity agent 150. In this non-limiting example, the sheet 125 is a decorative paper without a translucent overlay paper above the decorative paper (although the TFL process is not limited to only decorative papers as sheet 125). The sheet 125 next enters an oven to be pre-cured 620 (e.g., at 150-170° C. for 40-180 seconds). The sheet 125 is then placed on a drying or storage rack to finish curing 630. The sheet 125 then is placed over 640 a substrate 110 inside a press, where the substrate 110 is a porous panel product that is at least 4 mm thick (e.g., MDF or HDF instead of kraft paper or other thin substrates). Next the press uses temperature and pressure to press 650 the sheet 125 directly to the substrate 110 (e.g., at 165-190° C. for 0.3-4 minutes under 175-400 pounds-per-square-inch (psi) of pressure). FIG. 9 illustrates an example of a stainable laminate product 100 where the layers illustrated could have been formed using the TFL process as described in FIG. 6 (but FIG. 9 may also be created using other processes aside from a TFL process).

Figure 7:
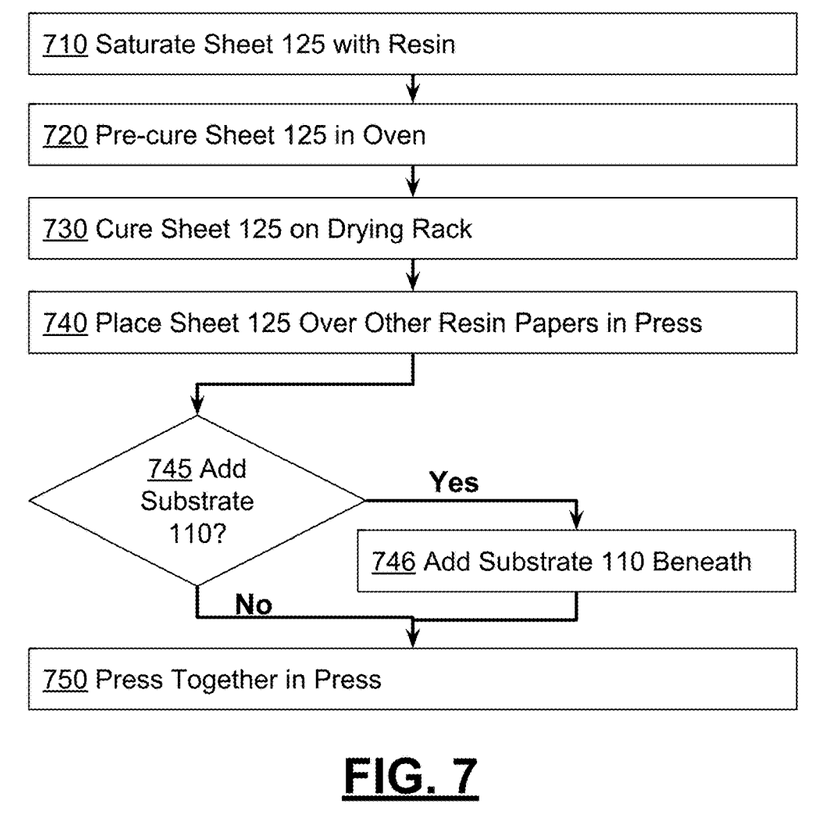
Figure 11:
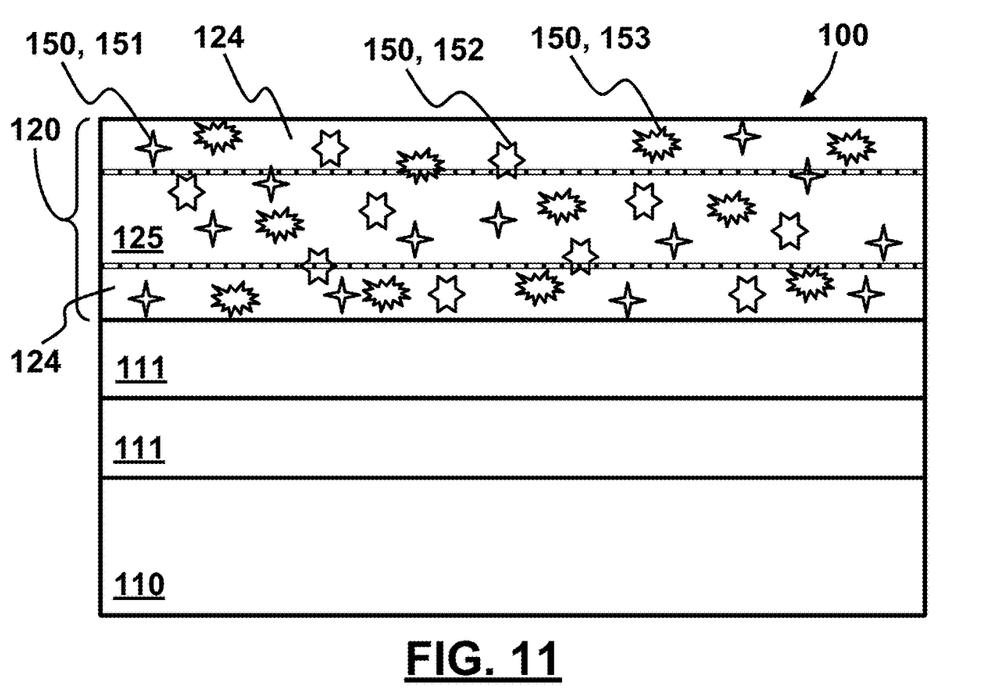

FIG. 7 provides a non-limiting example of a stainable laminate product 100 created using a high pressure laminate (HPL) process. A sheet 125 is saturated 710 with melamine resin containing at least one porosity agent 150. In this non-limiting example, the sheet 125 is a translucent overlay paper (although the HPL process is not limited to only overlay paper as sheet 125). The sheet 125 next enters an oven to be pre-cured 720 (e.g., at 260-300° C. for 100-150 seconds). The sheet 125 is then placed on a drying or storage rack to finish curing 730. The sheet 125 then is placed 740 in a press over other layers of cured resin saturated papers, which include a resin saturated decorative layer and at least one resin saturated layer of kraft paper (these lower layers do not contain porosity agents 150 in this example). In some embodiments (i.e., "yes" in 745), this stack of sheet 125 and other paper sheets is also positioned 746 on top of a substrate 110 inside the press, where the substrate 110 is a porous panel product that is at least 4 mm thick (e.g., MDF or HDF instead of kraft paper or other thin substrates). Finally, the press uses temperature and pressure to press 750 the sheet 125 onto the underlying sheets of decorative paper, kraft paper, and optionally a substrate 110 (e.g., at 250-300° C. for 5-60 minutes under 800-1200 psi of pressure). FIG. 11 illustrates an example of a stainable laminate product 100 where the layers illustrated could have been formed using the HPL process as described in FIG. 7 (but FIG. 11 may also be created using other processes aside from an HPL process). In some implementations, the amount of porosity agents 150 (e.g., untreated silica particles, wax particles, mica, calcium carbonate, talc, silane, kaolin clay, crystalline silica, corn starch, feldspar, titanium dioxide, cellulosic particles, combinations thereof, etc.) added to the saturation resin 324 formulation (e.g., melamine resin 124) is between 15% and 65% of the total formulation weight of the saturation resin 324 (e.g., 15-65%, 15-60%, 15-55%, 25-65%, 35-65%, 40-65%, 35-60%, or any other range between 5% and 65%). In some implementations, the amount of porosity agents 150 added to a melamine resin 124 is between 35% and 80% of the total formulation weight of the melamine resin 124 (e.g., 35-80%, 35-70%, 45-55%, 35-65%, 40-60%, 40-65%, 45-70%, or any other range between 35% and 80%). The amount of porosity agents 150 added to the melamine resin 124 formulation in certain implementations is between 30% and 60% of the total formulation weight of the melamine resin 124. In addition, the amount of porosity agents 150 added to a thermosetting acrylic resin formulation may also be between 30% and 80% of the total formulation weight of the thermosetting acrylic resin (which may or may not also include melamine resin 124). In some embodiments, one or more of silane, organosilane, or polyvinyl butyral are added to the saturation resin 324 or melamine resin 124 to reduce the amount of porosity agents 150 required by 1-30%, e.g., at least 1%, 5%, 10%, 15%, 20%, etc.

Some experiments resulted in a wood stain not taking hold in a stainable melamine layer 120 until the amount of porosity agents 150 reached nearly 50% of the formulation weight of the melamine resin 124. In spite of the significant amount of porosity agents present in the melamine resin 124, these experiments resulted in a stainable melamine layer 120 that adhered well to the underlying substrate 110. In some embodiments, the amount of porosity agents 150 added to the melamine resin 124 formulation is between 45% and 60% of the total weight, or preferably 50% ±3% of the formulation weight of the melamine resin 124.

The total amount of porosity agents 150 ranging from 5% to 65% of the total formulation weight of the resin 324 (e.g., melamine resin 124 and/or thermosetting acrylic resin) may be comprised of a single porosity agent 150 or multiple porosity agents 150 (e.g., a first porosity agent type 151, a second porosity agent type 152, and a third porosity agent type 153). Different types of porosity agents 150 may be used together (e.g., silica, talc, and Kaolin clay within the same formulation). Different varieties within the same type of porosity agents 150 may be used together (e.g., two or more different varieties of kaolin clay within the same formulation). Different sizes of one or more types of porosity agents 150 may be used together (e.g., talc of 5-10 μm used with talc of 35-45 μm; mica of 10-20 μm used with talc of 30-40 μm; or other combinations of sizes). Different densities of one or more types of porosity agents 150 may be used together (e.g., cellulosic particles of about 1.1 g/cm$^3$ used with cellulosic particles of about 1.6 g/cm$^3$; cellulosic particles of about 1.5 g/cm$^3$ used with talc of about 2.8 g/cm$^3$; or other combinations of densities). Accordingly, a single formulation of resin 324 (e.g., melamine resin 124 and/or thermosetting acrylic resin) may contain numerous different types, varieties of the same type, sizes, or densities of porosity agents 150 within the resin 324 formulation.

In some implementations, the particle size of the porosity agents 150 ranges from 1 μm to 110 μm (e.g., 1-100 μm, 1-90 μm, 1-85 μm, 1-75 μm, 1-60 μm, 1-50 μm, 1-35 μm, or any other range between 1 μm and 110 μm). In certain implementations, the particle size of the porosity agents 150 ranges from 1 μm to 85 μm. In some implementations, the particle size of the porosity agents 150 ranges from 1 μm to 50 μm. In certain implementations, the particle size of talc porosity agents 150 ranges from 1 μm to 50 μm. In some implementations, the particle size of wax porosity agents 150 (e.g., micronized organic polymer waxes) ranges from 1 μm to 40 μm.

In some implementations, the density of the porosity agents 150 ranges from 0.5 g/cm$^3$ to 4.5 g/cm$^3$ (e.g., 0.5-4.5 g/cm$^3$, 0.9-3.8 g/cm$^3$, 1.0-3.5 g/cm$^3$, 0.8-4.1 g/cm$^3$, 0.8-3.5 g/cm$^3$, 1.2-3.2 g/cm$^3$, 0.5-4.5 g/cm$^3$, or any other range between 0.5 g/cm$^3$ and 4.5 g/cm$^3$). In certain implementations, the density of the porosity agents 150 ranges from 0.8 g/cm$^3$ to 3.5 g/cm$^3$. In some implementations, the density of the porosity agents 150 ranges from 1.2 g/cm$^3$ to 3.2 g/cm$^3$.

Porosity agents 150 generally increase the overall mass of the melamine layer 120. For example, conventional melamine processing may result in 70-100 grams per square meter being added or picked up by the paper. That is, conventional melamine processing often has a "pick up weight" of between 10 and 100 grams per square meter ("gsm"). In contrast, the disclosed melamine resin 124 including porosity agents 150 has resulted in pick up weights ranging from 100 to 240 grams per square meter. In some embodiments, the pick up weight of the melamine layer 120 is between 100 and 240 grams per square meter (e.g, 110-230 gsm, 120-215 gsm, 110-180 gsm, or 130-215 gsm). In some embodiments, the pick up weight of the melamine layer 120 is between at least 110 grams per square meter (e.g, at least 110, 120, 125, 130, 140, 150, or 170 gsm).

The size and density of the porosity agents 150 will affect the depth of impregnation or saturation into the melamine layer 120 and also the sheet 125 within the melamine layer 120. The melamine resin 124 is impregnated into one or more sheets 125 of paper (e.g., kraft paper, decorative paper, overlay paper, etc.), fabric, linen, or fibrous material where the porosity and saturation properties of the sheet 125 can affect the depth and manner of how different porosity agents 150 embed themselves within the sheet 125. In some implementations, the sheet 125 of paper or other medium is manufactured with sufficient porosity to allow the porosity agents 150 to penetrate into and throughout the sheet 125. Porosity agents 150 with higher densities within the disclosed ranges will tend to have the ability to impregnate deeper within the sheet 125 provided these dense particles are sufficiently small to pass into interior portions of the sheet 125. Porosity agents 150 that are larger than the openings on the surface of and within the sheet 125 will not saturate deep into the sheet 125 and will rest on or close to the surface of sheet 125. Thus, the porosity and structure of a sheet 125 of paper (or other medium) can be combined with particular sizes and densities of porosity agents 150 to result in a melamine layer 120 impregnated with porosity agents 150 at uniform or varying amounts depending on the depth.

The porosity agents 150 (e.g., untreated silica particles, wax particles, mica, calcium carbonate, talc, silane, kaolin clay, crystalline silica, corn starch, feldspar, titanium dioxide, calcium oxide, wollastonite, cellulosic particles, combinations thereof, etc.) are added to the resin 324 (e.g., melamine resin 124 and/or a thermosetting acrylic resin) before the resin 324 becomes fully reacted and rigid. The porosity agents 150 may be added to the resin 324 formulation before a catalyst is added. The porosity agents 150 may also be added to the resin 324 formulation after a catalyst is added, but before the resin 324 becomes fully reacted and rigid. Talc and untreated silica particles are preferable porosity agents 150 in some implementations for their absorption characteristics. In some implementations, at least two different types of porosity agents 150 are included in the resin 324 formulation before pressing and curing the melamine layer 120. Existing melamine presses may be used to press at least one stainable melamine layer 120 onto a substrate 110, such as: kraft paper, decorative paper, backing layer(s), foil, porous panel product, wood, engineered wood, flooring, fabric, linen, fibrous sheets, cellulose, or other surfaces where melamine laminate layers are used. Existing melamine presses may be used, for example, by including porosity agents 150 to the melamine resin 124 formulation before pressing and curing the melamine layer 120 in the melamine press. The porosity agents 150 may be added to a melamine resin 124 formulation that is then pressed using either textured or non-textured pressing plates (e.g., caul plates) using any one of a variety of laminate pressing methods. The melamine layer 120 containing the porosity agent(s) 150 results in a stainable melamine layer 120 where a wood stain, colorant, or stain can embed itself into the stainable melamine layer 120 because of the porosity provided by the porosity agent(s) 150. After staining the stainable melamine layer 120, a finishing coating may be applied on top to seal the porous (and stainable) top melamine layer 120 of the stainable melamine product 100. Failing to seal and apply a finishing coating to the stainable laminate product 100 creates the risk of accidentally staining the stainable melamine layer 120 with food, dirt, or other contaminants. Thus, the stainable laminate product 100 behaves similar to a traditional wood product that is sealed after being stained to prevent inadvertent staining in the future.

Referring generally to FIGS. 8-13, a stainable melamine layer 120 including at least one porosity agent 150 (e.g., untreated silica particles, wax particles, mica, talc, etc.) may be affixed to a substrate 110, such as: a backing layer, a porous panel product, or other natural or synthetic substrate products as described throughout this disclosure. The stainable melamine layer 120 includes porosity agents 150 and melamine resin 124 impregnated in any one of a variety of different sheets 125 including, for example: decorative paper, kraft paper, overlay paper, cellulose paper, foil, nylon, rayon, wood pulp, wood veneer, linen, fabric, or other papers or fibers for use in laminates or with melamine resin 124. The stainable melamine layer 120 may be affixed to a variety of products that conventionally use wood stains (e.g., cabinetry, wood products, flooring, siding, furniture, shelving, etc.) and products that do not currently use wood stains (e.g., staining a non-wood product or using a non-traditional stain on wood or non-wood products). In certain preferred implementations, the stainable melamine layer 120 is affixed to porous panel products, cabinetry, furniture materials, boards, flooring, or engineered wood products. A stainable melamine layer 120 that has been partially or fully cured may be postformed into various curved or bent shapes.

The melamine layer 120 may contain two or more different types of porosity agents 150 mixed in varying amounts depending on the implementation. The melamine layer 120 may contain a single type of porosity agent 150 (see FIG. 8), two different types of porosity agents 150 (see FIG. 9), three different types of porosity agents 150 (see FIGS. 2 & 11), or four or more different types of porosity agents 150 (not shown). For example, the stainable laminate product 100 shown in FIG. 2 may include the following combination of porosity agents 150 (by volume of just the porosity agents 150): 55% untreated silica particles; 20% wax particles; and 25% mica. The stainable melamine layer 120 may also contain more than one size of the same type of porosity agent 150, such as: different sizes of a single porosity agent 150 (see FIG. 10); different sizes of each porosity agent 150 within a melamine layer 120 having multiple types of porosity agents 150 (not shown); or different sizes of a single porosity agent 150 within a melamine layer 120 having multiple types of porosity agents 150 (not shown). In some implementations, the sheet 125 in melamine layer 120 is impregnated with between 4 and 8 different types of porosity agents 150. Any combination of different types, amounts (by volume or weight), and/or sizes of the disclosed porosity agents 150 and their equivalents may be used within at least one melamine layer 120 of the stainable laminate product 100.

Figure 8:
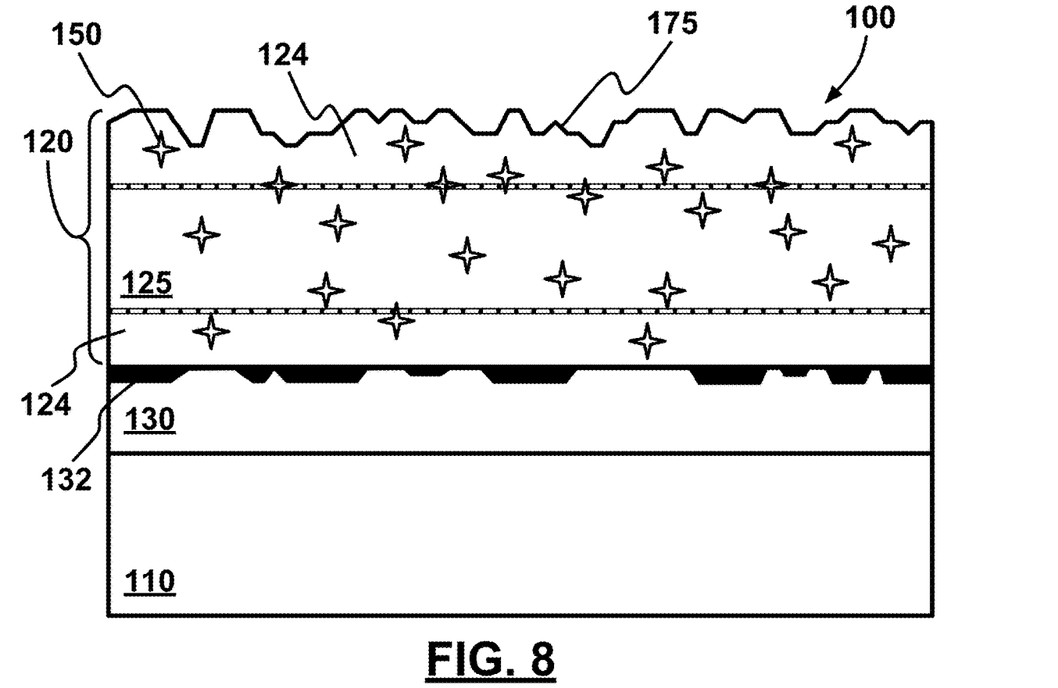
FIGS. 8-13 depict various non-limiting examples of a stainable melamine product.
Figure 12:
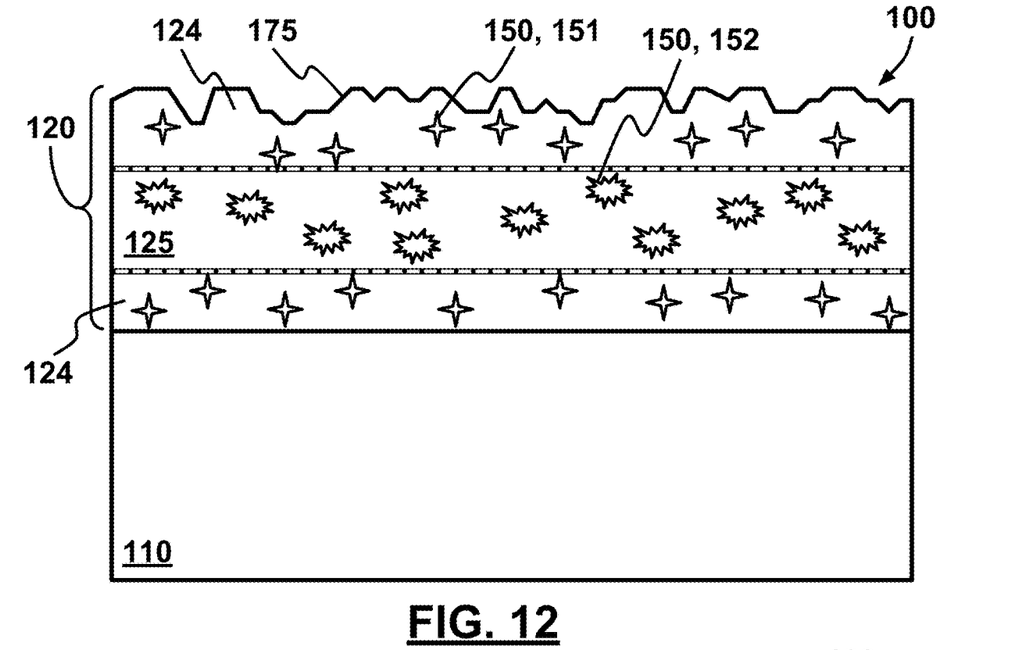

In the non-limiting example of FIG. 8, the material used for the sheet 125 has a sufficiently porous structure that the porosity agent 150 saturate and penetrate into sheet 125. However, in the non-limiting example of FIG. 9, the material used for the sheet 125 is not sufficiently porous to permit the porosity agent types 151 and 152 to saturate and penetrate into sheet 125, thus all of the porosity agents 150 in FIG. 9 are confined to the space above and below the sheet 125. FIG. 12 depicts a non-limiting example of a sheet 125 that has been impregnated with or manufactured to contain one or more porosity agents 150 before being saturated in a resin saturation bath 340. Thus, porosity agent 152 of FIG. 12 is already present in the sheet 125 when the sheet is saturated in the resin saturation bath 340 to add the resin 324 and the porosity agent 151.

Figure 13:
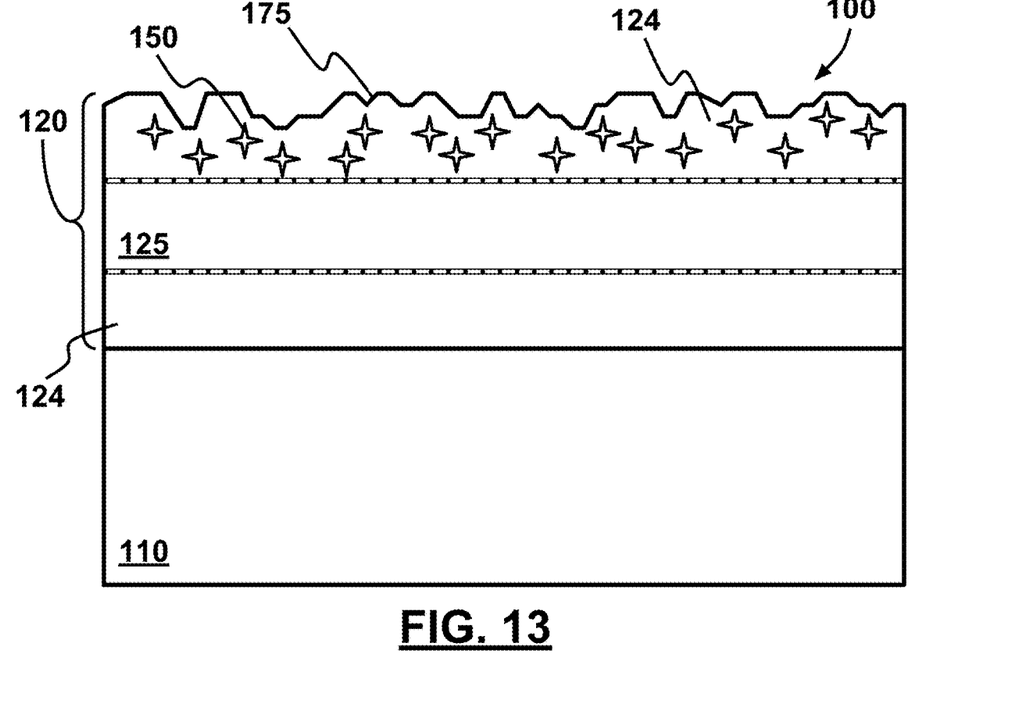

In some embodiments, the melamine resin 124 is deposited only on the top surface of the sheet 125. Existing manufacturing techniques allow a melamine layer to be deposited on top of a sheet of paper. FIG. 13 depicts a non-limiting example of where the melamine resin 124 containing porosity agents 150 is deposited only on the top surface of the sheet 125, which results in the porosity agent 150 residing on top of the sheet 125, but not below the sheet 125.

In numerous implementations, a backing layer 111 is applied to the melamine layer 120. The backing layer 111 may serve one or more of the following purposes: promote adhesion between a porous panel product and the adjacent melamine layer 120; stiffen the stainable melamine layer 120; omit one or more steps (e.g., etching or sanding) involved in preparing the porous panel product for adhering to the adjacent melamine layer 120; show decorative designs and/or colors through non-opaque melamine layer(s) 120; or provide a smooth surface for laminate melamine adhesion. The backing layer 111 may be a sheet coated or saturated in a phenolic resin, such as a sheet of paper or kraft paper soaked in phenolic resin or phenol formaldehyde resin. Multiple backing layers 111 of the same or different types may be affixed between the substrate 110 (e.g., a porous panel product) and the stainable melamine layer 120 (e.g., see FIG. 11). A backing layer 111 is not limited to using sheets of paper, and various natural fibers (e.g., wood, pulp, cotton, ground coconut shells, ground corn stocks, etc.) and/or synthetic fibers or sheets (e.g., plastics, nylon, fiberglass reinforced plastic, etc.) may be used as a backing layer 111. Similarly, a backing layer 111 is not limited to using phenolic resins.

In some implementations, decorative designs may be printed, deposited, etched, carved, scored, sanded, stamped, engraved, embossed, burned, fixed, and/or marked on one or more of a decorative paper layer, kraft paper, a backing layer 111, or directly on a substrate 110 or core (e.g., a porous panel product). In some implementations, surface embossing or other variations are introduced with a textured caul plate or an embossed sacrificial layer in a melamine press.

Figure 10:
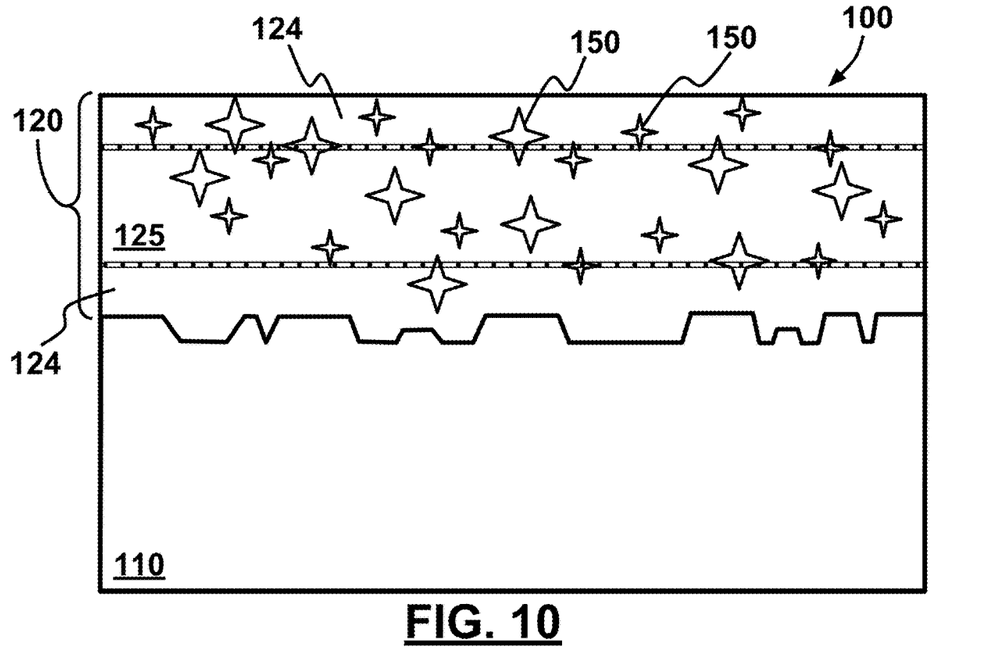

FIGS. 2 and 8 depict non-limiting examples of a decorative paper layer 130 (e.g., a design printed as a printed layer 132 on the decorative paper) that may be saturated with melamine, thermosetting acrylic, phenolic, urea formaldehyde, or other laminating resins. FIG. 9 depicts a non-limiting example of a design printed as a printed layer directly on a porous panel product (or another substrate 110 or core) with a backing layer 111 and decorative paper layer 130 omitted. FIG. 10 depicts a non-limiting example of a textured design etched (e.g., sanded, laser-etched, carved, etc.) directly on a substrate 110. The decorative design may include any one or more of various different colors within a color space (including hue, saturation, and lightness). The decorative design may also be as simple as a single color with nothing printed or etched thereon. These decorative designs may mimic natural products (e.g., wood, wood veneers, fibers, plants, etc.), geometric shapes or patterns, artistic designs, or other designs according to consumer taste and demand. If a decorative design is printed, etched, or otherwise used, then the melamine layer(s) 120 above the decorative design will have at least a degree of transparency (e.g., using translucent overlay paper) so that the decorative design is visible or otherwise changes the appearance of the stainable laminate product 100. In some implementations the decorative design mimics a wood grain. In certain preferred implementations the decorative design mimics a wood grain where the saturation and/or lightness is adjusted so that the colors used produce a wood grain design that allows the wood stain or colorant that is subsequently added to the stainable melamine layer 120 to adjust the final look of the color.

In some implementations, the stainable melamine layer 120 has a textured surface 175 (e.g., see FIGS. 8, 12, and 13). The textured surface 175 may primarily serve as a decorative element to enhance the look or feel of the stainable laminate product 100. The textured surface 175 allows for deeper penetration of the stain into the recessed portions of the surface, thereby providing additional visual depth to the stained surface. The textured surface 175 may be added using textured pressing plates of a melamine press (e.g., caul plates, embossed sacrificial sheets or foils, or the like), and may be implemented using either high pressure or low pressure melamine press configurations. In some implementations, the textured surface 175 may also be formed after pressing the melamine and etching or otherwise texturing the melamine (and before the melamine resin 124 fully cures or hardens). The texture may also be applied through a method of roller application in which the graining pattern is applied through pressure in a continuous embossing process. The textured surface 175 may be used with any combination of: decorative designs (i.e., including colors) on the backing and/or decorative paper; multiple layers of melamine (both stainable melamine layers 120 and conventional melamine layers; or multiple layers of backing, substrates, overlay papers, and/or decorative paper. The textured surface 175 may also be used on a stainable melamine layer 120 above a conventional melamine layer containing an overlay, decorated or undecorated paper or foil, or other paper.

A stainable laminate product 100 may include a plurality of melamine layers 120 and/or a plurality of decorative paper layers 130, backing layers 111, cores, or substrates 110. Multiple backing layers 111 or substrates 110 may be used (as mentioned above) and one or more of these backing layers 111 can be or contain a decorative paper layer 130 (e.g., a decorative paper, a textured or embossed paper, a printed backing, and so forth). In some implementations, the stainable laminate product 100 includes two or more layers of melamine stacked one atop the other. In some implementations at least the top-most layer is a stainable melamine layer 120 that includes at least one type of porosity agent 150. The stainable laminate product 100 may contain a traditional or standard melamine layer (e.g., providing strength and/or sealing benefits) positioned below a stainable melamine layer 120 that includes at least one type of porosity agent 150 enabling a wood stain, colorant, or stain to embed into the second melamine layer 120. The stainable laminate product 100 may also include different porosity agents 150 depending on the melamine layer 120, such as a first stainable melamine layer 120 having only one type of porosity agent 150 while a second stainable melamine layer 120 has multiple types of porosity agents 150. In some implementations a layer of melamine includes one or more porosity agents 150 that are embedded or deposited only in an upper portion of the melamine layer 120 (as shown in FIG. 13).

In certain preferred implementations, the stainable laminate product 100 includes a textured surface 175 formed by a textured pressing plate of a melamine press on a substrate affixed to a decorative paper and one to three non-opaque melamine layers 120 containing at least one type of porosity agent 150. In some implementations, the stainable laminate product 100 includes a substrate affixed to a first side of a backing layer 111 having a decorative paper on a second side of the backing layer 111, and at least one non-opaque melamine layer 120 affixed to the decorative paper, wherein at least the top-most melamine layer 120 contains at least one type of porosity agent 150 and has a textured surface 175. In certain implementations, the stainable laminate product 100 includes a backing layer 111, where a decorative paper is fixedly sandwiched between the backing layer 111 and one to three non-opaque melamine layers 120, where the top-most melamine layer 120 contains at least one type of porosity agent 150 and has a textured surface 175.

The present invention is further illustrated by the Figures and Claims that should not be construed as limiting. The contents of all references, patents, and published patent applications cited throughout this application, as well as the Figures, are incorporated herein by reference in their entirety for all purposes.

What is claimed is:

1. A stainable melamine laminate product, comprising:
   a substrate; and
   a porous, stainable top melamine layer affixed to the substrate, wherein the porous, stainable top melamine layer comprises a stainable melamine formulation and a sheet impregnated with the stainable melamine formulation wherein the sheet is a paper or fiber sheet;
   wherein the stainable melamine formulation comprises a melamine resin and at least two porosity agents, wherein the at least two porosity agents are selected from the group consisting of: kaolin clay; corn starch; talc; mica; calcium carbonate; cellulosic particles; wax particles; precipitated calcium carbonate; wollastonite; and combinations thereof;
   the at least two porosity agents are in an amount of between 75 to 150 grams per square meter; and the amount of porosity agents sufficiently allows deep and even staining of the stainable top melamine layer,
   and wherein the at least two porosity agents are stacked one on top of the other to form a path extending from an upper surface to a lower surface of the stainable top melamine layer to allow a stain to seep into, distribute, and hold in the stainable top melamine layer.

2. The stainable melamine laminate product of claim 1, wherein the at least two porosity agents comprise 50% to 75% of the weight of the stainable melamine formulation before curing.

3. The stainable melamine laminate product of claim 2, wherein the at least two porosity agents comprise at least about 60% of the weight of the stainable melamine formulation before curing.

4. The stainable melamine laminate product of claim 2, wherein the at least two porosity agents comprise about 60-75% of the weight of the stainable melamine formulation before curing.

5. The stainable melamine laminate product of claim 1, further comprising:
a phenolic backing layer having a first side and a second side opposite the first side, the first side being affixed to the substrate; and
a decorative design on the phenolic backing layer.

6. The stainable melamine laminate product of claim 1, wherein:
the substrate is a phenolic backing layer having a first side and a second side opposite the first side, the first side being affixed to the melamine layer;
wherein the melamine-impregnated sheet is non-opaque and the at least two porosity agents in the stainable melamine layer are in an amount between 75 to 145 grams per square meter.

7. The stainable melamine laminate product of claim 1, wherein the stainable melamine formulation further comprises at least a third porosity agent, wherein the combination of porosity agents is at least 65% of the weight of the stainable melamine formulation after curing.

8. The stainable melamine laminate product of claim 7, wherein the at least two porosity agents are at least 70% of the weight of the stainable melamine formulation after curing.

9. The stainable melamine laminate product of claim 7, wherein the at least two porosity agents are about 70-80% of the weight of the stainable melamine formulation after curing.

10. A stainable melamine laminate product, comprising:
a substrate; and
a porous, stainable top melamine layer affixed to the substrate, wherein the porous, stainable top melamine layer comprises a stainable melamine formulation and a sheet impregnated with; the stainable melamine formulation wherein the sheet is a paper or fiber sheet; wherein the top stainable melamine formulation comprises a melamine resin and at least two porosity agents, wherein the at least two porosity agents are selected from the group consisting of: kaolin clay; corn starch; talc; mica; calcium carbonate; cellulosic particles; wax particles; precipitated calcium carbonate; wollastonite; and combinations thereof,
wherein the
at least two porosity agents are at least 60% of the weight of the melamine formulation after curing or the at least two porosity agents are between 50-75% of the melamine formulation weight before curing; and the amount of porosity agent allows deep and even staining of the stainable top melamine layer;
and wherein the at least two porosity agents are stacked one on top of the other to form a path extending from an upper surface to a lower surface of the stainable top melamine layer to allow a stain to seep into, distribute, and hold in the stainable top melamine layer.

11. The stainable melamine laminate product of claim 10, wherein the at least two porosity agents are at least 65% of the weight of the stainable melamine formulation after curing.

12. The stainable melamine laminate product of claim 11, wherein the at least two porosity agents are selected from the group consisting of: talc, calcium carbonate, precipitated calcium carbonate, and combinations thereof.

13. The stainable melamine laminate product of claim 11, wherein the at least two porosity agents are at least 65% of the weight of the stainable melamine formulation after curing.

14. The stainable melamine laminate product of claim 11, wherein the at least two porosity agents are at least 70% of the weight of the stainable melamine formulation after curing.

15. The stainable melamine laminate product of claim 10, wherein the at least two porosity agents comprise: talc; calcium carbonate or precipitated calcium carbonate.

16. The stainable melamine laminate product of claim 10, wherein the at least two porosity agents are between 60-75% of the total melamine formulation weight before curing.

* * * * *